United States Patent
Sinquin et al.

(10) Patent No.: US 12,037,543 B2
(45) Date of Patent: Jul. 16, 2024

(54) METHOD FOR TREATING PRODUCTION WATER FROM THE ENHANCED OIL RECOVERY OF OIL BY HYDROCYCLONE IN THE PRESENCE OF ADDITIVES OF TETRAKIS(HYDROXYMETHYL) PHOSPHONIUM SALT TYPE

(71) Applicant: IFP Energies nouvelles, Rueil-Malmaison (FR)

(72) Inventors: Anne Sinquin, Rueil-Malmaison (FR); Bruno Delfort, Rueil-Malmaison (FR); Yves Benoit, Rueil-Malmaison (FR); Isabelle Henaut, Rueil-Malmaison (FR); Celine Bouvry, Rueil-Malmaison (FR); Laurence Podesta-Foley, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 240 days.

(21) Appl. No.: 17/416,795

(22) PCT Filed: Dec. 10, 2019

(86) PCT No.: PCT/EP2019/084515
§ 371 (c)(1),
(2) Date: Jun. 21, 2021

(87) PCT Pub. No.: WO2020/126706
PCT Pub. Date: Jun. 25, 2020

(65) Prior Publication Data
US 2022/0073810 A1    Mar. 10, 2022

(30) Foreign Application Priority Data

Dec. 20, 2018 (FR) ........................ 1873520

(51) Int. Cl.
| | | |
|---|---|---|
| *C09K 8/588* | (2006.01) | |
| *B01D 17/02* | (2006.01) | |
| *B01D 17/04* | (2006.01) | |
| *C02F 9/00* | (2023.01) | |
| *E21B 43/20* | (2006.01) | |
| *E21B 43/34* | (2006.01) | |
| *C02F 1/38* | (2023.01) | |
| *C02F 1/66* | (2023.01) | |
| *C02F 1/68* | (2023.01) | |
| *C02F 101/32* | (2006.01) | |
| *C02F 103/10* | (2006.01) | |

(52) U.S. Cl.
CPC .......... *C09K 8/588* (2013.01); *B01D 17/0217* (2013.01); *B01D 17/047* (2013.01); *C02F 9/00* (2013.01); *E21B 43/20* (2013.01); *E21B 43/34* (2013.01); *C02F 1/38* (2013.01); *C02F 1/66* (2013.01); *C02F 1/682* (2013.01); *C02F 2101/32* (2013.01); *C02F 2103/10* (2013.01)

(58) Field of Classification Search
CPC .. C09K 8/588; B01D 17/2017; B01D 17/047; C09F 9/00; E21B 43/20; E21B 43/34; C02F 1/682; C02F 2101/32; C02F 103/10
See application file for complete search history.

(56) References Cited

U.S. PATENT DOCUMENTS

| | | | |
|---|---|---|---|
| 2010/0204068 A1 | 8/2010 | Kesavan et al. | |
| 2016/0069160 A1* | 3/2016 | Sherman | B08B 17/00 134/2 |
| 2016/0097004 A1* | 4/2016 | Adamski | B01D 17/06 204/567 |
| 2016/0122209 A1* | 5/2016 | Newman, Jr. | B01D 17/0214 210/744 |
| 2017/0002259 A1* | 1/2017 | Jones | C09K 8/68 |
| 2017/0004324 A1 | 1/2017 | Seo et al. | |

FOREIGN PATENT DOCUMENTS

WO    2017/123095 A1    7/2017

OTHER PUBLICATIONS

International Search Report PCT/EP2019/084515, mailed Feb. 11, 2020; English translation submitted herewith (5 pgs.).

* cited by examiner

*Primary Examiner* — Silvana C Runyan
(74) *Attorney, Agent, or Firm* — FITCH, EVEN, TABIN & FLANNERY LLP

(57) ABSTRACT

A process treats production water resulting from enhanced oil recovery, the production water comprising an aqueous phase and an organic phase dispersed in the aqueous phase, and at least one polymer in the aqueous phase. The process includes:
a step of bringing said production water into contact with an additive comprising at least one tetrakis(hydroxymethyl)phosphonium salt (THMP salt),
a step of separating the aqueous phase and the organic phase of said production water comprising said additive, by means of a hydrocyclone.
An enhanced recovery process uses a step of treating the production water according to the invention.

19 Claims, 2 Drawing Sheets

Figure 1:
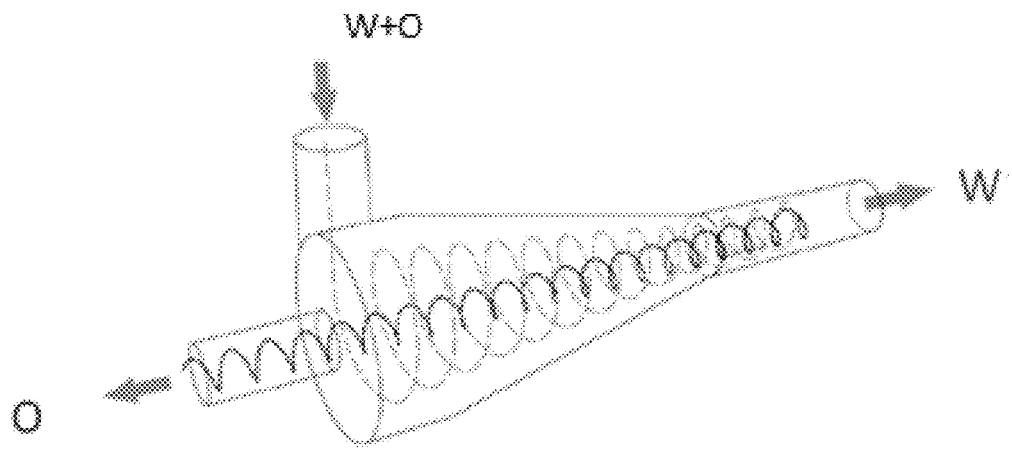

METHOD FOR TREATING PRODUCTION WATER FROM THE ENHANCED OIL RECOVERY OF OIL BY HYDROCYCLONE IN THE PRESENCE OF ADDITIVES OF TETRAKIS(HYDROXYMETHYL) PHOSPHONIUM SALT TYPE

CROSS-REFERENCE TO RELATED APPLICATIONS

This application is a U.S. national phase application filed under 35 U.S.C. § 371 of International Application No. PCT/EP2019/084515, filed Dec. 10, 2019, designating the United States, which claims priority from French Patent Application No. 1873520, filed Dec. 20, 2018, which are hereby incorporated herein by reference in their entirety.

TECHNICAL FIELD

The present invention relates to the field of exploring for and exploiting a subterranean formation. The invention relates more particularly to the treatment of a fluid recovered from the subterranean formation. The invention relates in particular to the field of enhanced oil recovery (EOR) and the field of treating production water.

PRIOR ART

For the exploration and exploitation of a subterranean formation, it is common practice to inject a fluid into the subterranean formation in order to increase the efficiency of the processes (Han D. K. & al, Recent Development of Enhanced Oil Recovery in China, J. Petrol. Sci. Eng. 22(1-3): 181-188; 1999). There are several enhanced oil recovery methods. When the injected fluid, also known as sweep fluid, has compounds added to it, the term tertiary enhanced recovery is used. These chemical compounds are polymers, surfactants, alkaline compounds, or mixtures of these compounds. This operation is known by the name chemical EOR.

Specifically, to optimize these processes, it is customary to include at least one formulation of organic molecules, such as polymers, copolymers and/or surfactants, etc. Compared to a single injection of water or brine, the advantage of the presence of a polymer is to increase the viscosity of the sweep fluid and consequently to improve the mobility ratio between the injected fluid and the hydrocarbons in place in the subterranean formation.

The use of polymers in tertiary enhanced recovery nevertheless presents practical problems. At the producing wells, a production effluent is recovered which comprises a mixture of aqueous fluid and of hydrocarbons in the form of an emulsion, the water/hydrocarbon ratio of which changes as a function of the duration of production. The presence of polymer in the production effluent, due to the viscosifying effect of said polymer, makes it more difficult to separate the various fluids (oil/gas/water) and, in particular, to carry out secondary treatments of the water (Zhang Y. Q & al. Treatment of produced water from polymer flooding in oil production by the combined method of hydrolysis acidification dynamic membrane bioreactor-coagulation process, J. Petrol. Sci. Eng., 74 (1-2): 14-19; 2010). When the production effluent reaches the surface, it is treated in a surface unit. This unit makes it possible to separate the various fluids, namely gas, oil and water. At the outcome of the surface treatment, the hydrocarbons are ready to be refined. The water is treated and decontaminated in order to minimize toxic product discharges into the environment, the thresholds of which are subject to standards. The presence of the polymer in the produced fluids, as is reported in document SPE 65390 (2001) "Emulsification and stabilization of ASP Flooding Produced liquid", can lead to the stabilization of the emulsions in the produced fluids and can present problems in terms of the surface treatment processes, in terms of the water/oil/gas separation and, in particular, in terms of the secondary water treatment processes.

Oil production by a chemical EOR process may in particular be applied to maintain or improve the production of a reservoir. Among the families of polymers used in EOR are water-soluble polymers of high molar masses such as polyacrylamides (PAM), partially hydrolysed polyacrylamides (HPAM), or certain polysaccharides (xanthans, guars, etc.). These polymers viscosify the aqueous phase in the reservoir and thus make it possible to notably increase the degree of recovery of the oil present in the pores of the rock.

After a certain period of time, the polymers thus injected are found (generally in small amounts and partially degraded) in the production water.

Various techniques are applied for treating production water, in particular for removing dispersed drops of crude: sedimentation by gravity separation, centrifugation, flotation with or without injection of gas, and filtration.

The treatment of production water by hydrocyclone is a very widely used process, in particular offshore, due to its high efficiency and its small size. This process, generally placed after the first gravity separator, is a continuous process based on a separation by centrifugal force of two phases having a different density (see FIG. 1).

The internal geometry of the hydrocyclon induces a rotational movement of the liquids, owing to the cyclonic movement imposed on the fluid, the dense phase (here water) is pressed against the wall and is discharged at one end of the geometry whereas the not very dense phase (oil) concentrates at the centre of the device and is discharged at the other end. The applicant noticed that the presence of partially degraded polymer, even in a small amount in the production water, had a negative influence on the performance of the hydrocyclone. Thus, the degradation of the performance may go as far as to make the hydrocyclone separation process ineffective and does not appear to be due solely to the increase in the viscosity of the aqueous solution.

It was observed that the biocides commonly used in the fracturing fluids injected into subterranean formations, such as tetrakis(hydroxymethyl)phosphonium salts, depolymerize polymers and therefore reduce the viscosity of the polymer solutions (US2010/0204068) and that it is furthermore possible to control the biocidal activity without degrading the polymer by addition of an oxidizing breaker (US2017/004324 A1). These compounds are used for their antibacterial properties in the drilling fluids and in the fracturing fluids used in the oil industry or as iron sulfide scavengers for treating petroleum production water.

Surprisingly, tests carried out with a laboratory hydrocyclone show that bringing the production water to be treated into contact with an additive selected from tetrakis(hydroxymethyl)phosphonium salts makes it possible to regain the performance of the hydrocyclone separation process. Unexpectedly, this effect is demonstrated even though the amount of polymer present is small enough not to induce an increase in the viscosity of the aqueous solution.

SUMMARY OF THE INVENTION

The invention relates to a process for treating production water resulting from enhanced oil recovery, said production water comprising an aqueous phase and an organic phase dispersed in said aqueous phase, and at least one polymer in the aqueous phase, said process comprising:

a step of bringing said production water into contact with an additive comprising at least one tetrakis(hydroxymethyl)phosphonium salt (THMP salt), of general formula

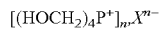

in which n is equal to 1, 2 or 3 and X is an anion with a valence equal to n, a step of separating the aqueous phase and the organic phase of said production water comprising said additive, by means of a hydrocyclone.

The anion may be a chloride ion, a bromide, a fluoride, an iodide, a hydroxide, a hydrogen sulfate, a dihydrogen phosphate, a pam such as for example a formate, an acetate, a propionate.

The anion may also be a sulfate, a hydrogen phosphate, an oxalate, preferably a sulfate.

The anion may be a phosphate.

Preferably, the additive is tetrakis(hydroxymethyl)phosphonium sulfate (THMP sulfate or THMPS) of formula:

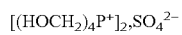

Said polymer is advantageously selected from: polyacrylamides (PAM) or partially hydrolysed polyacrylamides (HPAM), polysaccharides, or polymers comprising monomer units of N-vinylpyrrolidone or acrylamido-tert-butyl sulfonate (ATBS) type.

The pH of the production water is advantageously between 2 and 7, preferably between 2 and 5, very preferably between 3 and 5, during the contacting step.

It is possible to adjust the pH during the contacting step by addition of an acid or of a buffer salt.

Advantageously, the temperature of the contacting step is between 25° C. and 100° C., preferably between 50° C. and 100° C.

Advantageously, the concentration of tetrakis(hydroxymethyl)phosphonium salt is between 20 and 1000 ppm by weight relative to the total weight of production water, preferably between 20 and 300 ppm, very preferably between 20 and 100 ppm, more preferably still between 20 and 50 ppm.

Advantageously, the contact time corresponding to the duration of the contacting step between said production water and said additive is between 1 and 400 minutes, preferably between 1 and 320 minutes, very preferably between 1 and 60 minutes.

Advantageously, the concentration of said polymer in said production water is between 1 and 1000 ppm.

Preferably, the dispersed organic phase is crude oil.

The concentration of said crude oil in said production water is advantageously between 1 and 900 ppm.

The invention also relates to a process for enhanced recovery of crude oil contained in a geological reservoir, in which:

a sweep fluid comprising at least one polymer is injected into said reservoir so as to displace said hydrocarbons to at least one producing well;
an effluent comprising most of the crude oil is collected by said producing well;
a production water is recovered at the surface of the producing well, said production water comprising a continuous aqueous phase comprising traces of said polymer and an organic phase consisting of droplets of crude oil which are dispersed in said aqueous phase;

said production water is treated by means of the treatment process described above.

LIST OF THE FIGURES

Other features and advantages of the treatment process according to the invention will become apparent upon reading the following description of nonlimiting exemplary embodiments with reference to the appended figures described below.

FIG. 1 represents the principle of the separation by hydrocyclone for the treatment of the production water.

Figure 2:
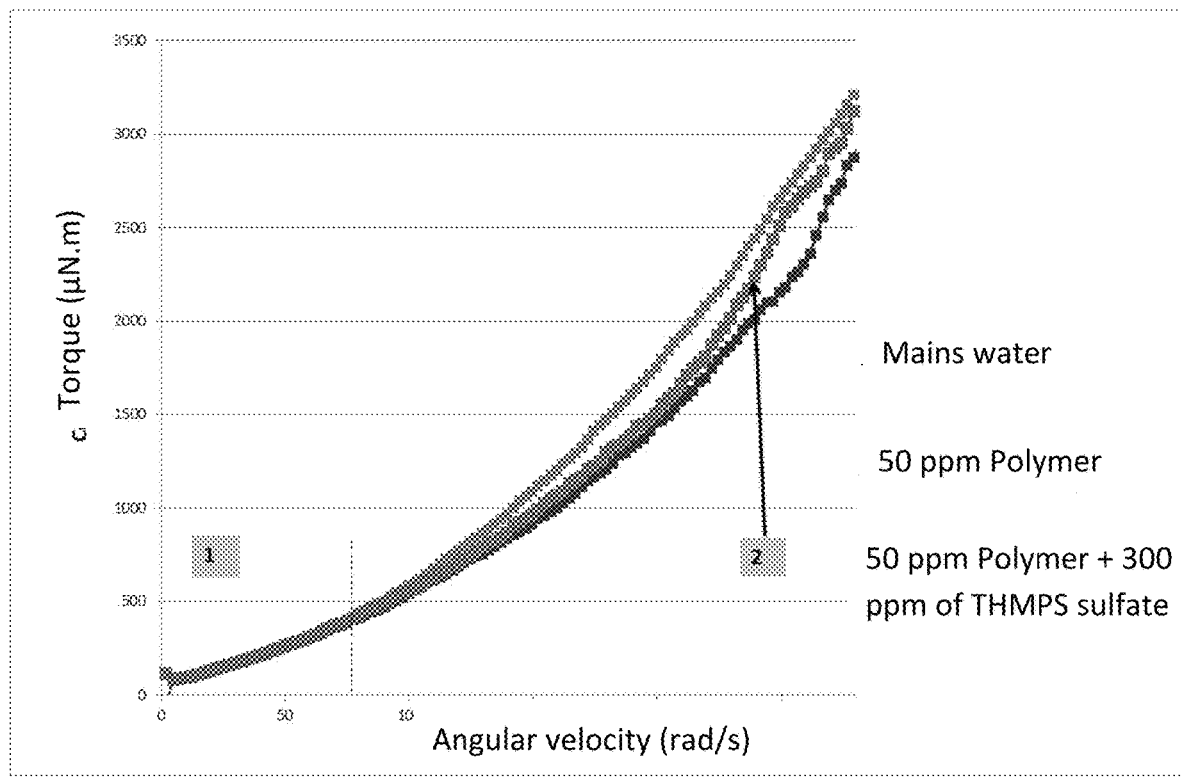

FIG. 2 presents the measurements of torque in μN·m as a function of the angular velocity (rad/s) for three types of formulations (water, 50 ppm polymer solution, 50 ppm polymer solution to which 300 ppm of THMPS has been added) carried out in the rheometer. At low angular velocities (1) the curves are superposed indicating that the solutions have the same viscosity. At high angular velocities (2) the polymer solution has a lower torque due to the absence of turbulence in the solution compared to the polymer solution to which 300 ppm of THMPS has been added or compared to water.

Figure 3:
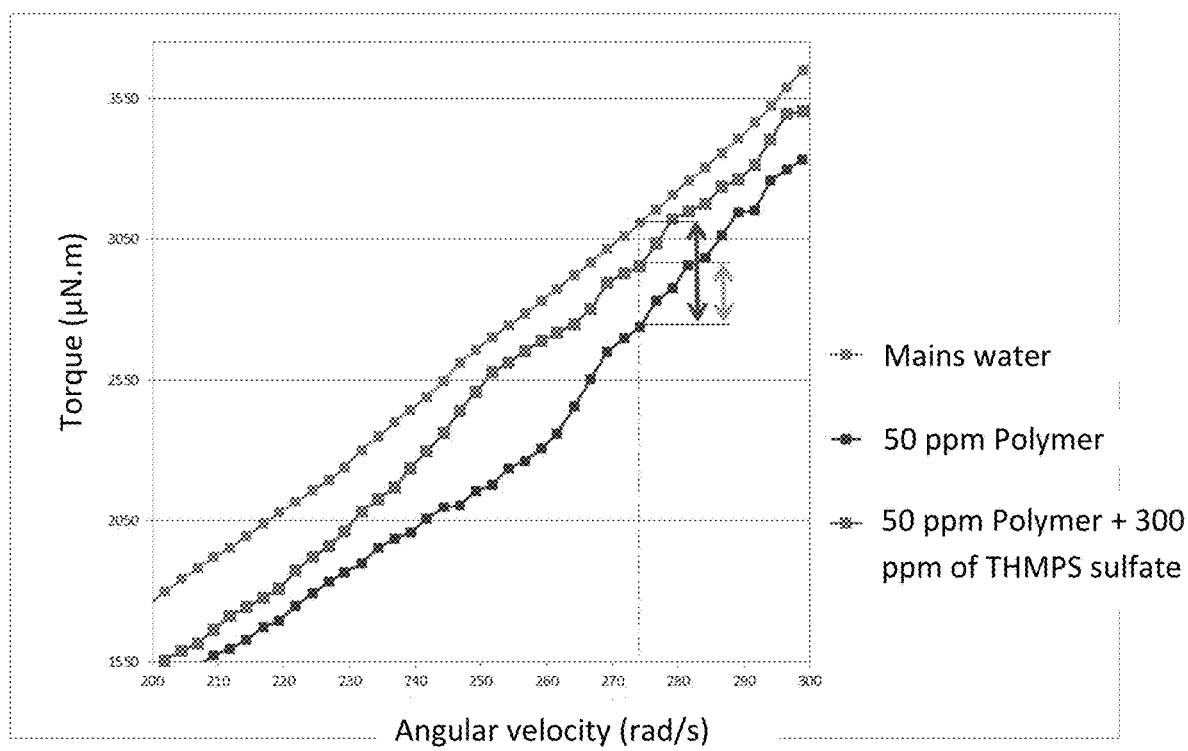

FIG. 3 represents the measurements of the turbulence-reducing effect measured in the rheometer at high angular velocities, the torque in μN·m as a function of the angular velocity (rad/s) for three types of formulations (water, 50 ppm polymer solution, 50 ppm polymer solution to which 300 ppm of THMPS has been added).

DESCRIPTION OF THE EMBODIMENTS

In the description and examples, the concentrations of additive or of polymer are expressed in ppm by weight (i.e. in mg per kg of production water comprising the polymer and the optional additive(s)), which means that the content in ppm of the additive or of the polymer relative to the total weight of production water is calculated.

More particularly, the present invention applies to the treatment of a production water resulting from a first step of water/oil separation applied to a petroleum effluent, the effluent being derived from an enhanced recovery of hydrocarbons trapped within a subterranean formation. The present invention may also apply directly to a petroleum effluent, when this effluent is very predominantly aqueous.

The products used in the invention are tetrakis(hydroxymethyl)phosphonium salts (referred to as THMP salts).

They correspond to the general formula:

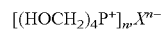

in which n is equal to 1, 2 or 3 and X is an anion with a valence equal to n, $X^{n-}$ maybe a chloride, a bromide, a fluoride, an iodide, a hydroxide, a hydrogen sulfate, a dihydrogen phosphate, a carboxylate such as for example a formate, an acetate, a propionate; in this case, the anion is monovalent (n=1).

$X^{n-}$ may be a sulfate, a hydrogen phosphate, an oxalate; in this case, the anion is divalent (n=2).

$X^{n-}$ may be a phosphate; in this case, the anion is trivalent (n=3).

Preferably, the anion is a sulfate and the compound of the invention is tetrakis(hydroxymethyl)phosphonium sulfate (THMPS) which corresponds to the following formula:

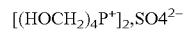

Tetrakis(hydroxymethyl)phosphonium salts, also known as THMP salts and sometimes also as "THP salts", are generally obtained by reaction of phosphine with formaldehyde in the presence of an acid HnX. The synthesis and the structure of THMP chloride have been described in the Journal of the American Chemical Society, vol. 43, p. 1684 (1921) and vol. 52, p. 3923 (1930). The synthesis of THMP salts is described for example in documents U.S. Pat. Nos. 2,743,299, 3,835,194, 4,044,055.

The chemistry of the hydroxymethyl phosphorus compounds to which the products of the invention belong has been described in particular in the documents "Chemistry of Hydroxymethyl Phosphorus Compounds, Part I to Part IV" published in the Textile Research Journal, November 1982, pp. 671-693 and December 1982, pp. 738-755.

These compounds find many applications, in particular in the textile industry, as flame retardants or incorporated into the manufacture of flame retardants. They are also used in the leather industry, and as a bleaching agent in the paper industry. Some of them, such as the sulfate, are also used for their antibacterial properties in the drilling fluids and fracturing fluids used in the petroleum industry or as iron sulfide scavengers for water treatment.

The conventional polymers used in EOR are polymers of high molar masses which generally belong to the polyacrylamide (PAM) family or the partially hydrolysed polyacrylamide (HPAM) family. They may optionally contain monomer units of N-vinylpyrrolidone or acrylamido tert-butyl sulfonate (ATBS) type. The polymers may also be selected from polysaccharides (guar gum, xanthan and scleroglucan in particular).

Even present at very low concentrations, the polymers used for enhanced oil recovery (EOR) drastically reduce the separation performance of the hydrocyclones, by decreasing the degree of turbulence. At very low concentrations of polymer, this reduction in efficiency is not due to an increase in the viscosity of the aqueous phase.

Simple shear tests in a rheometer show that the treatment of the polymer in aqueous solution with an additive of tetrakis(hydroxymethyl)phosphonium salt type makes it possible to return to the degree of turbulence measured in the absence of polymer. The additive therefore eliminates the turbulence-reducing effect due to the polymer residues in the production water in the hydrocyclone. The addition of a tetrakis(hydroxymethyl)phosphonium salt to the aqueous solution comprising the polymer(s) makes it possible to regain the water-oil separation performance of the hydrocyclone.

The concentration of salt of formula (1) described above is between 20 and 1000 ppm in the continuous aqueous phase comprising the dispersed crude and the polymer(s) (production water), preferably between 20 and 300 ppm, very preferably between 20 and 100 ppm, more preferably still between 20 and 50 ppm, calculated relative to the total weight of production water.

For example, for a production water comprising a continuous aqueous phase, between 1 and 900 ppm of droplets of dispersed crude, and from 1 to 1000 ppm of polymer in aqueous solution, the amount of salt of formula (1) introduced is of the order of 20 to 1000 ppm, calculated relative to the total weight of the constituents of the production water. The salt of formula (1) is introduced into the aqueous solution before the introduction of the production water into the hydrocyclone by bringing the production water into contact with said additive. The contact time is generally between a few minutes and a few hours, preferably between 1 min and 400 min, very preferably between 1 and 320 min, more preferably still between 1 and 60 min. The contact time may be adjusted as a function of the nature of the polymer used for the enhanced oil recovery and of the average molar mass thereof.

Generally, the pH of a production water resulting from enhanced oil recovery may be acidic, neutral or basic, depending on the composition of the production water, on the presence, if any, of traces of acidic compounds such as $CO_2$ or $H_2S$ or of basic compounds within the context of processes that use alkaline surfactants for example.

The pH of the medium during the contacting step is advantageously between 2 and 7, preferably between 2 and 5, very preferably between 3 and 5. The pH can be adjusted if necessary, preferentially by adding acid of HCl type, or a buffer salt of sodium citrate type.

EXAMPLES

Example 1: Hydrocyclone Separation Tests (Oil 1)

Water-oil separation tests were carried out in a laboratory hydrocyclone with a production water that comprises an aqueous phase and a dispersed oil phase consisting of crude oil. Various aqueous phase compositions were tested: water, water containing polymer of HPAM type in solution, water containing polymer and a THMP salt (THMP sulfate, referred to as THMPS).

The polymer in this example is a partially hydrolysed HPAM having an average molecular mass of between 6 and 8 MDa (HPAM1). The contents of polymer and of additive (THMP salt) are indicated in the "concentrations" column of Table 1.

The comparative results of the performance of the hydrocyclone are given in Table 1. The performance of the hydrocyclone is a water cleaning percentage calculated with an equation of the type:

$$([HC]W+O-[HC]w)/[HC]W+O = \text{performance (in \%)}$$

where [HC]W+O is the concentration of hydrocarbons at the inlet of the hydrocyclone and [HC]w is the concentration of hydrocarbons at the "water" outlet of the hydrocyclone according to FIG. 1.

With no polymer, the water-oil separation performance is close to 80% under optimized conditions.

The presence of polymer, even at very low concentrations (50 ppm), although not changing the viscosity of the aqueous phase, leads to a drastic degradation of the performance (between 18.6% and 21.4% separation). When the test is repeated with a polymer solution bought into contact beforehand with an additive according to the invention (THMPS), the performance of the hydrocyclone returns to a level similar to that measured in the absence of polymer (between 72.1% and 78.8%).

The loss of performance due to the presence of polymer is attributed to a turbulence-reducing effect or DRA (Drag Reducing Agent) effect of the latter: without wishing to be tied by any one theory, the presence of the polymer seems to prevent the formation of vortices in the geometry of the hydrocyclone, yet these vortices are necessary for the water/oil separation in the geometry. Measurements of torque as a function of the angular velocity of the solutions of water without polymer, water with polymer and water with polymer plus additive according to the invention (THMPS) were carried out in a rheometer (FIG. 2). These measurements show in particular that the low content of polymer does not give rise to an increase in viscosity of the aqueous phase, but that the polymer clearly has a turbulence-reducing effect. In the laminar zone, the curves are superposed owing to identical viscosities. On the other hand, in the turbulent zone, the polymer present in a small amount in the aqueous solution has a torque-reducing effect. The results furthermore show that this effect is clearly cancelled out at high shears, i.e. under conditions of very high turbulence (high shear rates), for a solution to which THMPS has been added.

TABLE 1

| Test | [EOR] Concentrations ppm | Content of dispersed crude (inlet) ppm | [HC] Content of dispersed crude (outlet) ppm | Content of crude in the effluent discharged ppm | Performance of the water-oil separation (%) |
|---|---|---|---|---|---|
| Production water | 0 | 620 | 130 | 2950 | 79.0 |
| Production water + HPAM1 | 50 ppm HPAM1 | 700 | 550 | 1280 | 21.4 |
|  |  | 730 | 510 | 1000 | 18.6 |
| Production water + HPAM 1 + THMPS | 50 ppm HPAM1 + 300 ppm THMPS | 680 | 190 | 2200 | 72.1 |
|  |  | 680 | 140 | 3200 | 78.8 |

In example 1, the polymer is diluted to 50 ppm in the production water. The effect of the polymer on the performance of the hydrocyclone is not due to the viscosity, but in all likelihood is due to the anti-turbulence effect of the polymer in the hydrocyclone. The water-oil separation performance of the hydrocyclone is therefore affected.

The treatment of the production water with the THMPS additive at a content of 300 ppm relative to the total weight of production water makes it possible to regain the separation performance of the hydrocyclone. At the same time, it is observed that the treated production water displays torque levels measured at high speeds in the rheometer which are close to those of the water without polymer.

Thus it appears that the production water containing polymer residues, which have an anti-turbulence effect in the rheometer, will have a poor performance in the hydrocyclone. Conversely, treatment of the production water with a THMP salt brings the level of these turbulences to a level close to that of the reference water, which indicates that the treatment process according to invention makes it possible to regain performance levels of the hydrocyclone that are similar to those obtained for a production water containing no polymer residues.

Example 2: Influence of the Parameters on the Torque Measured in the Rheometer and on the Efficiency of the Hydrocyclone Before each rheometer test, a series of reference torque measurements is carried out on mains water to evaluate the correct operation of the device; these measurements are carried out at the two study temperatures (25° C. and 50° C.). The average values of the reference torque ($\mu N \cdot m$) at the four high angular velocities chosen are given in Table 2.

By varying certain parameters (pH, temperature, concentration, type of polymer), the variation of the measured torque relative to the reference torque (obtained with mains water with no polymer or additive) is determined in order to evaluate whether the treatment makes it possible to return to turbulence and therefore, in the case of the laboratory hydrocyclone test, to regain hydrocyclone separation efficiency performance.

Example 2 shows the influence of various parameters on the recovery of torque in the rheometer, therefore on the separation efficiency:

Influence of the pH (Table 2 and Table 3 and Table 4): By addition of HCl or of a buffer of sodium citrate type to the aqueous solution, the pH of the aqueous solution is adjusted to 3.4. The polymer used is the same as in Example 1 (HPAM1, with an average molar mass of 6 to 8 MDa). The additive is THMP sulfate, at a concentration of 25 or 50 ppm in the production water thus reconstituted. The contact time with the production water is 30 or 60 minutes.

Influence of the acidity of the medium on the treatment of a production water comprising 100 ppm of HPAM polymer with an average molar mass of 6 to 8 MDa, for a THMP sulfate concentration of 25 ppm, and a contact time of 30 minutes: the results are given in Table 2.

TABLE 2

| Angular velocity (rad/s) | 267 | 273 | 279 | 285 |
|---|---|---|---|---|
| % recovery of the torque Pure mains water | 0 | 0 | 0 | 0 |
| % recovery of the torque Water + citrate buffer (pH = 3.4) | 23 | 19 | 24 | 13 |

Influence of the acidity of the medium on the treatment of a production water comprising 100 ppm of HPAM polymer with an average molar mass of 6 to 8 MDa, for a THMP sulfate concentration of 50 ppm, and a contact time of 30 minutes: the results are given in Table 3.

TABLE 3

| Angular velocity (rad/s) | 267 | 273 | 279 | 285 |
|---|---|---|---|---|
| % recovery of the torque Mains water | 16 | 17 | 15 | 8 |
| % recovery of the torque Water + HCl acid pH = 3.4 | 74 | 64 | 54 | 47 |

Influence of the acidity of the medium on the treatment of a production water comprising 100 ppm of HPAM polymer with an average molar mass of 6 to 8 MDa, for a THMP sulfate concentration of 50 ppm, and a contact time of 60 minutes: the results are given in Table 4.

TABLE 4

| Angular velocity (rad/s) | 267 | 273 | 279 | 285 |
|---|---|---|---|---|
| % recovery of the torque Mains water | 25 | 21 | 17 | 16 |
| % recovery of the torque Water + HCl acid pH = 3.4 | 100 | 100 | 100 | 100 |

Conclusion: It is observed that the acidity of the medium reinforces the effect of the treatment with the THMP salt and makes it possible to recover more turbulence faster, and therefore to obtain a better separation efficiency in the hydrocyclone.

Influence of the Contact Time (Table 5, Table 6 and Table 7)

The polymer used is the same as in Example 1 (HPAM1, with an average molar mass of 6 to 8 MDa). The additive is THMP sulfate, at a concentration of 25 or 50 ppm. The contact time of the additive with the production water before measurement of the torque varies from 25 min to 200 min. The medium may or may not be acidic.

Influence of the contact time for the treatment of a non-acidic production water comprising 100 ppm of an HPAM with an average molar mass of 6 to 8 MDa, in mains water, to which the THMP sulfate additive is added as a content of 50 ppm. The contact time is varied. The results are given in Table 5.

TABLE 5

| Angular velocity (rad/s) | 267 | 273 | 279 | 285 |
|---|---|---|---|---|
| % recovery of the torque 30 min. | 16 | 17 | 15 | 8 |
| % recovery of the torque 60 min. | 25 | 21 | 17 | 16 |

Influence of the contact time, for an additive concentration of 25 ppm: The pH of the medium is adjusted, by addition of a sodium citrate buffer, to 3.4, the polymer is an HPAM with an average molar mass of 6 to 8 MDa at a concentration of 100 ppm, the concentration of THMP sulfate is 25 ppm in the production water. The contact time is varied. The results are given in Table 6.

TABLE 6

| Angular velocity (rad/s) | 267 | 273 | 279 | 285 |
|---|---|---|---|---|
| % recovery of the torque 25 min. | 23 | 19 | 24 | 13 |
| % recovery of the torque 200 min. | 91 | 98 | 100 | 100 |

Influence of the contact time, for an additive concentration of 50 ppm: The pH of the medium is adjusted to 3.4 by addition of HCl. The polymer is an HPAM with an average molar mass of 6 to 8 MDa, at a concentration of 100 ppm, the concentration of THMP sulfate is 50 ppm in the production water thus reconstituted. The contact time is varied. The results are given in Table 7.

TABLE 7

| Angular velocity (rad/s) | 267 | 273 | 279 | 285 |
|---|---|---|---|---|
| % recovery of the torque 30 min. | 74 | 64 | 54 | 47 |
| % recovery of the torque 60 min. | 100 | 100 | 100 | 100 |

Conclusion: It is observed that the longer the contact time between the polymer solution and the THMP, the higher the torque recovery performance and therefore the higher the performance of the hydrocyclone after treatment.

Influence of the Concentration of Additive (THMP Sulfate)

The pH of the medium is adjusted to 3.4 by addition of HCl, the contact time is 60 min. The polymer is an HPAM with an average molar mass of 6 to 8 MDa added at a concentration of 100 ppm in the production water thus reconstituted. The concentration of THMP sulfate in the production water is varied. The results are given in Table 8.

TABLE 8

| Angular velocity (rad/s) | 267 | 273 | 279 | 285 |
|---|---|---|---|---|
| % recovery of the torque for 20 ppm THMPS | 91 | 84 | 79 | 77 |
| % recovery of the torque for 50 ppm THMPS | 100 | 100 | 100 | 100 |

Conclusion: all other things being equal, it is observed that the higher the amount of THMP sulfate, the more effective the product is for making it possible to regain torque levels equal to those of the reference and therefore for regaining the water-oil separation performance in the hydrocyclone.

Influence of Temperature

The pH of the medium is adjusted to 3.4 by addition of a buffer of sodium citrate type, the concentration of THMP sulfate is 25 ppm. The polymer is an HPAM with an average molar mass of 6 to 8 MDa, present at a concentration of 100 ppm in the production water thus reconstituted. The results are given in Table 9.

TABLE 9

| Angular velocity (rad/s) | 267 | 273 | 279 | 285 |
|---|---|---|---|---|
| % recovery of the torque at RT Contact time = 25 min | 23 | 19 | 24 | 13 |
| T = 50° C. contact time 16 min. | 41 | 44 | 49 | 57 |

The efficiency of the treatment is improved at a temperature of 50° C., compared to treatment at room temperature, and makes it possible to reduce the contact time.

Conclusion: the higher temperature accelerates the reaction between the polymer and the THMP sulfate, therefore in a hydrocyclone, a higher temperature will make it possible to regain, either more quickly, or with less additive, the separation performance obtained without polymer.

Example 3: Rheometer Tests—Polymers of HPAM Type

In this example, two types of HPAM polymers, with different average molar mass, are tested at a concentration of 100 ppm in the production water, in order to evaluate the influence of the average molar mass of the polymer on the efficiency of the treatment.

HPAM1: average molar mass of 6 to 8 MDa

HPAM2: average molar mass of 17 to 21 MDa

A sodium citrate type buffer is added to the production water in order to adjust the pH of the medium to 3.4, the contact time is 200 min. The results are given in Table 10.

TABLE 10

| Average angular velocity (rad/s) | 267 | 273 | 279 | 285 |
|---|---|---|---|---|
| % recovery of the torque HPAM 6 to 8 MDa + 25 ppm of THMP sulfate | 91 | 98 | 100 | 100 |
| % recovery of the torque HPAM 17 to 21 MDa + 50 ppm of THMPS | 99 | 100 | 100 | 100 |

Conclusion:

It is observed that, at increasing molar mass of the polymer, it is necessary to add more THMP sulfate in order to regain the same performance level.

Example 4: Rheometer Tests—AA/ATBS Polymer

In this example, the polymer used is a copolymer composition of acrylic acid and 2-acrylamido-2-methylpropanesulfonic acid, also referred to as acrylamido-N-tert-butyl sulfonic acid, (polymer 3, AA/ATBS) with a very high average molar mass of 16.5 to 21 MDa. The composition tested (production water) comprises 25 ppm of polymer, 50 ppm of THMP sulfate, in the presence of a sodium citrate type buffer to adjust the pH of the medium to 3.4. Three contact times are evaluated: 40, 200, 320 minutes. It is observed that the contact time (CT) necessary for enabling a recovery of the performance of the hydrocyclone during the treatment of the production water comprising the polymer 3 is greater than that required for the polymers 1 and 2, but that the recovery of the performance of the hydrocyclone is complete for the longest contact times. The results are given in Table 11.

TABLE 11

| Angular velocity (rad/s) | 267 | 273 | 279 | 285 |
|---|---|---|---|---|
| % recovery of the torque CT = 40 min | 0 | 0 | 0 | 0 |
| % recovery of the torque CT = 200 min. | 100 | 100 | 100 | 100 |
| % recovery of the torque CT = 320 min. | 100 | 100 | 100 | 100 |

Example 5: Hydrocyclone Separation Tests (Oil 2)

Water-oil separation tests are conducted in a hydrocyclone as in Example 1, but for a production water comprising another type of dispersed crude (oil 2).

Table 12 presents the comparative results of the performance of the hydrocyclone for the treatment of a production water comprising the dispersed oil 2 (dispersed crude) and 100 ppm of HPAM polymer with a mass of 8 to 12 MDa, with and without coming into contact with THMP sulfate (THMPS) at a concentration of 100 ppm.

TABLE 12

| Test | ppm Concentrations | ppm Content of dispersed crude (inlet) | ppm Content of dispersed crude (outlet) | ppm Content of crude in the effluent discharged | (%) Performance of the water-oil separation |
|---|---|---|---|---|---|
| Production water oil 2 | 0 | 700 | 180 | 3000 | 74.3 |
|  |  | 700 | 200 | 3000 | 71.4 |
| Production water oil 2 + HPAM | 100 ppm HPAM (8 to 12 MDa) | 310 | 310 | 310 | 0 |
| Production water oil 2 + HPAM + THMPS | 100 ppm HPAM (8 to 12 MDa ) + 100 ppm THMPS | 666 | 169 | 3600 | 74.6 |

Conclusion: it is observed that the presence of HPAM polymer in the production water comprising the dispersed crude (oil 2) gives rise to a total loss of performance in terms of the separation between the aqueous phase and the organic phase in the hydrocyclone (water-oil separation). As in the case of Example 1, the treatment of the production water containing the oil 2 and the HPAM polymer, by coming into contact with the THMP sulfate, makes it possible to regain the separation performance of the hydrocyclone under the conditions studied.

The invention claimed is:

1. A process for treating production water resulting from enhanced oil recovery, the production water comprising an aqueous phase and an organic phase dispersed in the aqueous phase, and at least one polymer in the aqueous phase, a concentration of the at least one polymer in the production water being between 1 and 1000 ppm, the process comprising:
   a step of bringing the production water into contact with an additive comprising at least one tetrakis(hydroxymethyl)phosphonium salt (THMP salt), of general formula $$[(HOCH_2)_4P^+]_n X^{n-}$$

in which n is equal to 1, 2 or 3 and X is an anion with a valence equal to n, and
   a step of separating the aqueous phase and the organic phase of the production water comprising the additive, using a hydrocyclone, wherein the additive reduces a turbulence-reducing effect otherwise caused by residues of the at least one polymer in the production water in the hydrocyclone, in order to increase a water-oil separation performance of the hydrocyclone as compared to a water-oil separation performance of the hydrocyclone without the additive.

2. The process according to claim 1, in which the anion is a chloride ion, a bromide, a fluoride, an iodide, a hydroxide, a hydrogen sulfate, a dihydrogen phosphate, a carboxylate, an acetate, or a propionate.

3. The process according to claim 1, in which the anion is a sulfate, a hydrogen phosphate, or an oxalate.

4. The process according to claim 1, in which the anion is a phosphate.

5. The process according to claim 1, in which the additive is tetrakis(hydroxymethyl)phosphonium sulfate (THMP sulfate or THMPS) of formula $$[(HOCH_2)_4P^+]_2 SO_4^{2-}$$

6. The process according to claim 1, in which the polymer is at least one selected from a group consisting of polyacrylamides (PAM) or partially hydrolysed polyacrylamides (HPAM), polysaccharides, or polymers comprising monomer units of N-vinylpyrrolidone or acrylamido-tert-butyl sulfonate (ATBS) type.

7. The treatment process according to claim 1, in which a pH of the production water is between 2 and 7 during the contacting step.

8. The treatment process according to 7, in which the pH is adjusted during the contacting step by addition of an acid or of a buffer salt.

9. The treatment process according to claim 1, in which a temperature of the contacting step is between 25° C. and 100° C.

10. A water treatment process according to claim 1, in which a concentration of tetrakis(hydroxymethyl)phosphonium salt is between 20 and 1000 ppm by weight relative to a total weight of production water.

11. The treatment process according to claim 1, in which the contact time corresponding to a duration of the contacting step between the production water and the additive is between 1 and 400 minutes.

12. The treatment process according to claim 1, in which the organic phase dispersed in the aqueous phase is crude oil.

13. The process according to claim 12, in which the concentration of the crude oil in the production water is between 1 and 900 ppm.

14. A process for enhanced recovery of crude oil contained in a geological reservoir, in which:
- a sweep fluid comprising at least one polymer is injected into a geological reservoir containing crude oil so as to displace hydrocarbons to at least one producing well;
- an effluent comprising most of the crude oil is collected by the producing well;
- a production water is recovered at the surface of the producing well, the production water comprising a continuous aqueous phase comprising traces of the polymer and an organic phase consisting of droplets of crude oil which are dispersed in the aqueous phase; and
- the production water is treated by means of the treatment process according to claim 1.

15. The process according to claim 1, in which the anion is a sulfate.

16. The treatment process according to claim 1, in which a pH of the production water is between 2 and 5 during the contacting step.

17. The treatment process according to claim 1, in which a temperature of the contacting step is between 50° C. and 100° C.

18. A water treatment process according to claim 1, in which a concentration of tetrakis(hydroxymethyl)phosphonium salt is between 20 and 50 ppm.

19. The treatment process according to claim 1, in which the contact time corresponding to a duration of the contacting step between the production water and the additive is between 1 and 60 minutes.

* * * * *